UNITED STATES PATENT OFFICE.

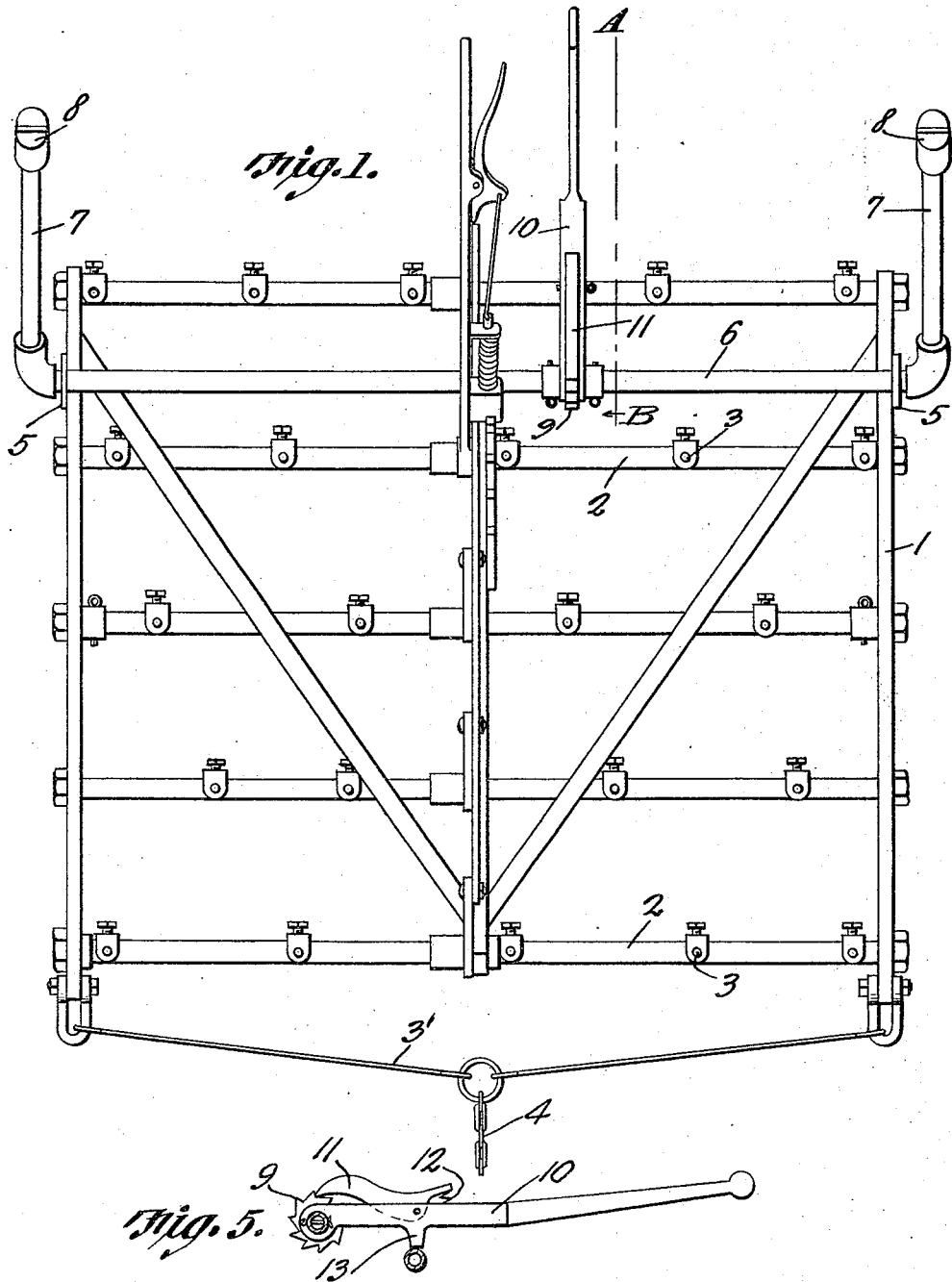

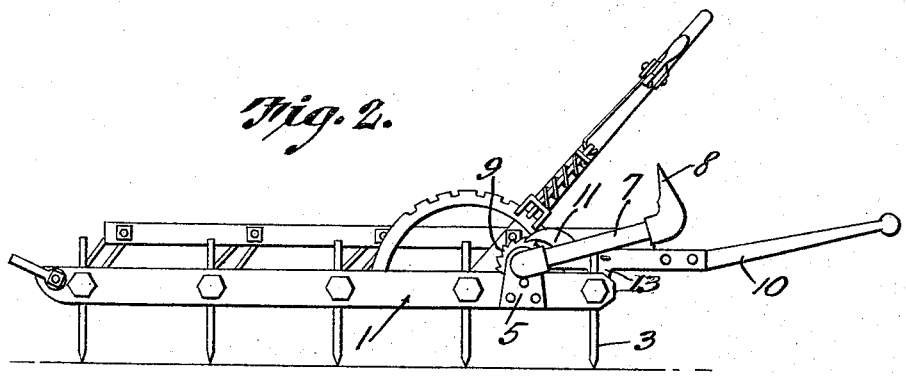
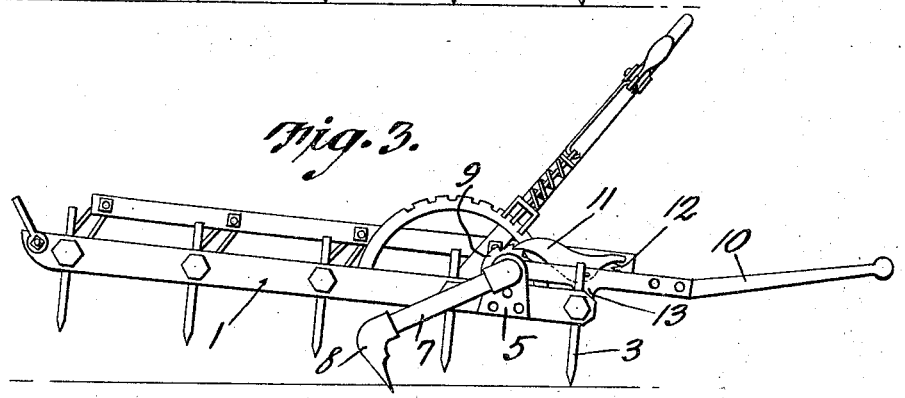
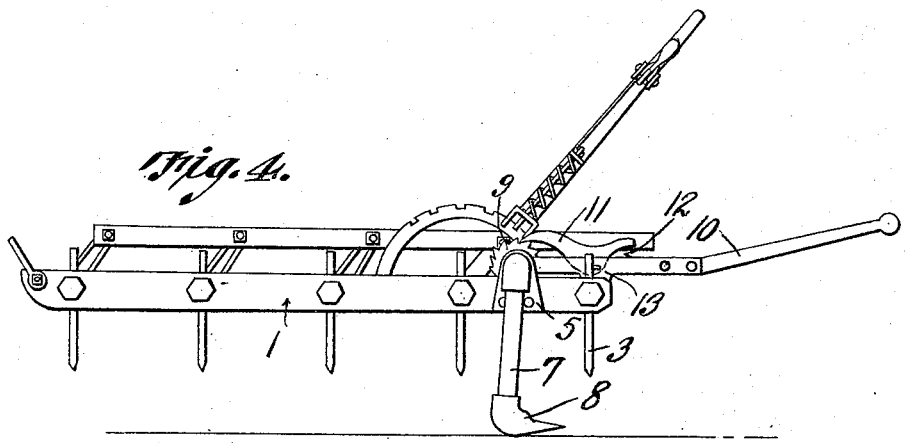

ABIJAH H. PEGG, OF DOWAGIAC, MICHIGAN.

DUMPING ATTACHMENT FOR HARROWS.

1,185,238.  Specification of Letters Patent.  Patented May 30, 1916.

Application filed April 5, 1915. Serial No. 19,205.

*To all whom it may concern:*

Be it known that I, ABIJAH H. PEGG, a citizen of the United States, residing at Dowagiac, in the county of Cass and State of Michigan, have invented a new and useful Dumping Attachment for Harrows, of which the following is a specification.

This invention relates to a dumping attachment for harrows, whereby after a certain amount of trash is accumulated under the harrow, the attachment can be used for causing the harrow to lift from the accumulated trash and pass over it, the front portion of the harrow first lifting out of engagement with the accumulated trash, after which the rear portion thereof clears the trash so that the trash will be left in a pile on the field.

A further object is to provide an attachment of this character which is simple, durable and efficient, and which can be applied readily to an ordinary harrow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a harrow having the present improvements combined therewith, the lifting attachment being shown in its normal or inactive position. Fig. 2 is a side elevation of the harrow on a reduced scale and showing the attachment in the position illustrated in Fig. 1. Fig. 3 is a view similar to Fig. 2 and showing the first movement of the harrow after the attachment has been brought into active position. Fig. 4 is a similar view showing the harrow while the rear portion thereof is raised out of engagement with the accumulated trash. Fig. 5 is a section on line A—B Fig. 1.

Referring to the figures by characters of reference 1 designates a harrow structure which can be of any preferred type, preferably of that form utilizing revoluble cross rods 2 from which extend teeth 3. The harrow is adapted to be drawn forwardly by means of rods 3' connected to the sides of the front end portion thereof, these rods being attached to the rear end of a draft chain 4 or the like. It is to be understood that any other suitable draft means may be used.

The attachment constituting the present invention includes brackets 5 adapted to be secured to the sides of the harrow adjacent the rear end thereof and in these brackets is journaled a cross bar 6, provided, at each end, with a radial arm 7 having a foot 8 preferably in the form of a pointed member extending at an angle from the arm as shown particularly in Figs. 2, 3 and 4. The two arms 7 are disposed in the same plane and the bar 6 is provided with a ratchet wheel 9. Straddling the ratchet wheel and loosely mounted on the bar 6 is a lever 10 to which is pivotally connected a pawl 11 held by a spring 12 normally in engagement with the ratchet wheel. This lever has a projection 13 adapted to bear upon the rear end of the harrow, thus to limit the downward movement of the lever 10. Under normal conditions the weight of the arms 7 is adapted to keep one of the teeth of the ratchet wheel 9 pressed rearwardly against the pawl 11 and, as the projection 13 normally bears downwardly on the harrow, it will be apparent that the arms 7 will be held in inactive position by their own weight.

It is to be understood that the front end of the harrow is shown at the left of each of the figures of the drawings. When the harrow is in the position shown in Fig. 3 and moves forwardly, the member 7 assumes the position shown in Fig. 4 and ultimately the harrow swings downwardly into engagement with the soil while the part 8 drags along the ground after the harrow. Obviously by swinging the lever 10 to the left in Fig. 4 after the harrow has returned to the ground and while the members 7 and 8 are dragging, the pawl 11 will swing the parts 7 and 8 upwardly from such dragging position to the position shown in Fig. 2. After the feet have been raised to the desired elevation, as shown for example in Fig. 2, one of the feet can be held supported by the operator while the lever 10 is released and will gravitate back to the position shown in Fig. 2. During this gravitation of the lever 10 to its normal position, pawl 11 will slip over the teeth of the ratchet wheel 9 and the feet 8 can then be released and will stand supported in the position shown in Fig. 2.

What is claimed is:—

The combination with a harrow, of a dumping attachment including a bar extending transversely thereof and mounted for rotation, radial arms extending from the bar and extending in the same plane, a pointed ground engaging element carried by the free end portion of each arm and extending at right angles therefrom, a lever, a pawl and ratchet connection between said lever and the bar, said lever being limited in its rotation by a portion of the harrow and coöperating with said portion of the harrow to hold the arms normally elevated out of engagement with the ground, said lever constituting means for rotating the bar to swing the arms forwardly and downwardly to bring the soil engaging devices into contact with the soil.

In testimony that I claim the foregoing as my own, I have hereto affixed my signature in the presence of two witnesses.

ABIJAH H. PEGG.

Witnesses:
   JOSEPHINE G. BRESNAHAN,
   A. H. RICHEY.

Copies of this patent may be obtained for five cents each, by addressing the "Commissioner of Patents Washington, D. C."